United States Patent [19]

Sauder

[11] 4,443,509

[45] Apr. 17, 1984

[54] INSULATION AND THE PROVISION THEREOF

[75] Inventor: Robert A. Sauder, Emporia, Kans.

[73] Assignee: Sauder Industries, Inc., Emporia, Kans.

[21] Appl. No.: 341,255

[22] Filed: Jan. 21, 1982

[51] Int. Cl.³ .................................... B32B 3/10

[52] U.S. Cl. .................................... 428/137; 52/506; 52/598; 110/336; 156/71; 264/30; 266/280; 428/138; 428/198; 428/209; 428/247; 428/255; 428/256; 428/902; 428/920

[58] Field of Search .................... 13/35; 52/506, 598, 52/391; 156/71; 428/137, 138, 300, 198, 209, 247, 255, 256, 920; 110/336; 226/280, 281; 264/30

[56] References Cited

U.S. PATENT DOCUMENTS

| | | | |
|---|---|---|---|
| 3,342,665 | 9/1967 | Shannon | 161/36 |
| 3,350,249 | 10/1967 | Gregoire | 156/92 |
| 4,120,641 | 10/1978 | Myles | 228/140 |
| 4,145,390 | 3/1979 | Zschimmer | 264/69 |
| 4,211,807 | 7/1980 | Yazawa et al. | 428/109 |
| 4,237,181 | 12/1980 | Tanabe et al. | 428/307 |

*Primary Examiner*—James J. Bell

*Attorney, Agent, or Firm*—Arnold, White & Durkee

[57] ABSTRACT

A method of forming an insulation module for insulating the walls of a furnace, the method including forming holes at spaced intervals in a cold face of a mat of ceramic insulation material, applying a liquid adhesive to the cold face, vibrating the adhesive to cause the adhesive to penetrate into the holes of the mat, and providing a backing panel on the cold face.

52 Claims, 10 Drawing Figures

Fig. 6
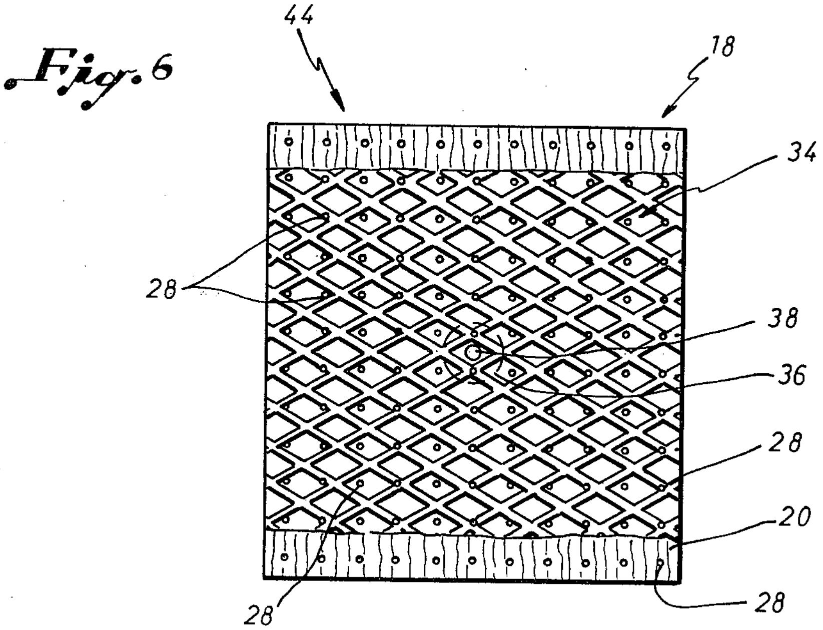
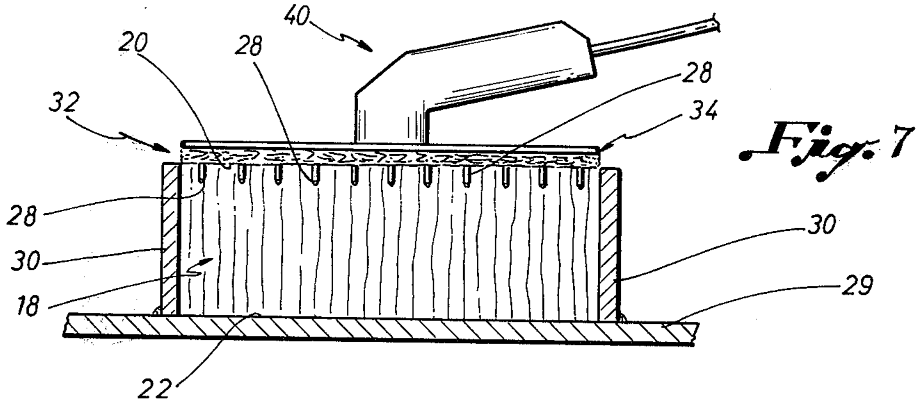
Fig. 7
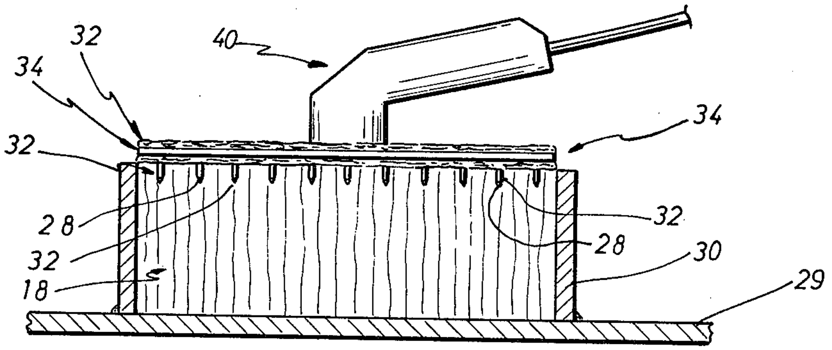
Fig. 8

INSULATION AND THE PROVISION THEREOF

This invention relates to insulation and the provision thereof. More particularly, this invention relates to an insulation member for use in insulating a surface, to a method for forming an insulation member, to a method of providing insulation for a surface, and to a method of attaching an insulation member to a surface. Still more specifically, this invention has particular application in regard to a high temperature insulation member for use in insulating a furnace surface, and to the provision of high temperature insulation in a furnace for insulating a furnace wall surface.

The problems involved in insulating the interior surfaces of the walls (comprising the walls, ceiling, interior door surfaces, and other furnace surfaces to be insulated) of a furnace are well-known. Historically, the interiors of high temperature furnaces have been lined with various types of bricks capable of withstanding high temperatures. When brick linings wear out, however, it is an odious and time consuming task to replace the old brick with new brick lining.

The disadvantages of brick linings, coupled with the need for more effective and higher temperature linings, has led to the use of insulating fiber materials such as ceramic fiber materials for providing insulation or for providing at least the hot face of the insulation.

Ceramic fiber material, as referred to herein, is generally available in the form of a ceramic fiber blanket which is customarily manufactured in processes similar to the conventional paper making processes. As such, the fibers which constitute the blanket are oriented in planes which are generally parallel to the longitudinal direction of formation of the blanket or sheet.

If sections of such a blanket or sheet are cut to form mats or batts, and are applied as such to an interior surface of a furnace, the mat or batt would be in the form of a blanket in which the ceramic fibers will be lying in planes generally parallel to the surface to which the mat or batt is attached.

In such blanket form application to a furnace surface, the majority of the fibers of the ceramic material will tend to be lying in a direction which would tend to be colinear with the direction of formation of the blanket itself, although a considerable number of fibers will still be in a more or less randomly disposed orientation. Where the fibers are disposed in planes which are parallel to the furnace wall, there is generally a tendency for the fiber blanket material to produce cracks which result from heat shrinkage.

In addition, when using ceramic fiber insulation in blanket form, high temperature environments lead to problems relating to cracking, delamination and devitrification.

Attempts have been made to overcome the problems presented by the use of ceramic fiber in blanket form by severing strips of fiber from such a formed sheet in a direction transversely to the direction of formation of the sheet.

These strips are cut from the fiber sheet in widths that represent the linear distance required from the cold face to the hot face of the insulating fiber mat. The cut strips are then placed on edge and laid lengthwise in side-by-side relationship with a sufficient number of strips being employed to provide a mat of a desired width.

When strips are employed in this manner the insulation can generally be referred to as "edge-grain" configuration. Edge-grain configuration therefore has this meaning when used in this specification.

Naturally, the thickness of the fiber sheet from which these strips are cut will determine the number of strips required to construct a mat of a required width.

By applying such strips to a furnace interior surface where the fibers of the ceramic fiber material generally extend transversely to the interior surface of the furnace wall, and where the fiber planes extend transversely to such interior surface, the problems presented by cracking, delamination and devitrification are substantially reduced.

In addition, since ceramic fiber material tends to be resiliently compressible (or at least compressible with a limited degree of resilience), the strips can be arranged in abutting relationship thereby avoiding gaps forming between adjacent strips as a result of shrinkage during use.

Whether insulation material is used in blanket or strip form, some suitable means is required to allow the insulation material to be affixed to an interior surface of a furnace wall. Various methods have been attempted to achieve this objective. Thus, for example, where insulation material is used in blanket form, pins or studs can be prewelded to a furnace wall and the insulation material can then be impaled onto the pins or studs and secured in position by means of nuts or the like.

This procedure is disadvantageous since the pins or studs must be premounted on the furnace walls in a specific layout. This presents the disadvantage that the positioning of the pins or studs cannot readily be altered when required. In addition, because the pins or studs will extend through the insulation material, they will be exposed to the temperature within the furnace and will conduct heat from the furnace directly to the furnace walls. This is not only wasteful but leads to the formation of undesirable hot spots in the furnace walls.

Where insulation material is used in strip form, the strips may be secured to a furnace wall by means of prewelded brackets which are welded to the furnace wall, with the strips being secured to the brackets by means of wires or the like which extend through the fiber strips. This again provides the disadvantage that the brackets must be prewelded in a particular layout making repositioning impossible or impractical. This provides the further disadvantage that the handling of the strips is tedious and laborious.

To overcome these disadvantages attempts have been made to secure insulation material to a furnace wall by mounting the insulation material on rigid ceramic material blocks or on supporting sheets or panels to form modules. The modules can then be separately handled and can be mounted on a furnace wall by mounting the rigid blocks, the sheets, or the panels to the furnace wall.

While this modular approach provides a number of advantages, it still presents the problem of effectively mounting the insulation material onto the rigid blocks, the sheets or the panels, as the case may be. Where the backing sheet is in the form of a rigid block, the fibers can be attached to the backing sheet by threading wires or rods through the insulating material and then attaching the wires or rods to the backing sheet by means of tying wires or the like at spaced intervals. This solution is, however, cumbersome and expensive. In addition, it is not particularly effective where the backing sheets are in the form of less rigid sheet material.

The most promising solution which has heretofore been suggested, has been to mount the insulation material onto a backing sheet by utilizing a temperature resistant adhesive. This solution has been relatively successful for many applications. However, in furnaces which operate in a sulfur environment or in which sulfur burning fuels are employed, corrosive liquids (which usually include sulfuric and/or sulfurous acids)-form on the inner walls of the furnace. As far as applicant is aware, available adhesives and ceramic cements are not capable of withstanding the action of such corrosive liquids over an extended period. The adhesive or cement therefore tends to fail after a period of use, resulting in premature failure of the modules and separation of the insulation material from the backing sheets and thus from the furnace walls.

In addition, in the presence of iron, the sulfuric and sulfurous acids react with iron to form iron sulfates. Applicant has found that these iron sulfates have an extremely corrosive effect on ceramic fiber.

Ironically, in attaching ceramic fiber insulation mats to a furnace wall by means of a temperature resistant adhesive or cement, the mat temperature gradient will normally not permit sulfuric or sulfurous acids to form except in the vicinity of the cold face of the mat. That is, only in the vicinity of the cold face of the mat, will the temperature be low enough for water vapor to be present and thus for the sulfuric and/or sulfurous acids to form. Therefore, in the very zone where the insulation system is most vulnerable, the corrosive acids can form (and do form when sulfur containing fuels are employed). Again, in the most vulnerable area, the furnace casing or a backing sheet of the insulation material, provides metal which is corroded by the acids in the interface zone of the insulation material and the furnace casing to produce ferric sulfates which corrode the ceramic fiber.

The life of such insulation is therefore limited since the adhesive or cement eventually becomes destroyed and/or the ceramic fibers which are in intimate contact with the adhesive or cement and serve to attach the remainder of the insulation mat to the backing sheet or furnace casing, as the case may be, will be subject to corrosive activity. The fibers will therefore tend to fail in the proximity of the adhesive or cement layer after a period of use. These twin failures in the critical zone will thus ultimately lead to failure of the insulation system.

Because of the well-known filtering properties of ceramic fibers, cements that have been tried have often purposely been made low in viscosity to that the resins or binders of the cement will be able to wet the fiber surface more thoroughly and make some penetration into the fiber surface. Although this technique is reasonably successful in accomplishing this wetting action, it has also caused a degradation of the cement. This degradation results from the constituents of the cement being separated by the filtering action of the fibers. Some cements are not so severely affected by this action as others are. However, applicants presently preferred cements, the silicate cements, are severely affected.

Air cured silicate cements are normally water soluble unless cured chemically or cured at very high curing temperatures. The preferred curing method is to use chemical curing agents. Some of these agents work well in producing cured cements which have excellent insolubility and resistance to chemical corrosives such as sulfuric acid. These good properties, however, are greatly diminished when the cement constituents are segregated. Thus the good properties are diminished when segregation occurs as a result of the filtering action of the fiber when coupled with lowered viscosity of the cements required for increased wetting and penetration.

Even though these otherwise excellent cements are damaged by the filtering action, they would sometimes still have adequate strength if it were not for the moisture and the corrosive action which tend to concentrate at the very location of the cement-fiber interface. The severest corrosive conditions therefore occur in the exact location where the cement has been weakened.

As you move through an insulation material from the cold face towards the hot face, the temperature increases dramatically. Therefore, in average high temperature furnace conditions, the insulation would normally be provided to produce a cold face temperature of about 250° F. Lower temperatures can therefore occur during use and moisture can and does form at the cold face thereby creating ideal conditions for the corrosion of adhesives or cements currently employed.

As you penetrate the insulation in the direction of the hot face, the temperature increases dramatically. Thus, for example, about $\frac{5}{8}$ths of an inch inwardly of the cold face which is at about 200° F., the temperature would be in the vicinity of about 1,200° F. Moisture can no longer exist at this very high temperature. It follows, therefore, that within about $\frac{1}{8}$th inch or less of the cold face, the temperature may be such that moisture cannot exist and the extreme corrosive conditions will therefore not arise.

The most affective method of improving the quality of silicate cements, is to increase the viscosity of such cements by reducing the quantity of added water. While this improves the cement quality, it also substantially reduces the wetting properties. This reduction in wetting properties therefore offsets the advantage provided by the increased quality of the more viscous cement.

It is accordingly an object of this invention to provide an insulation member, and a method of forming such a member, and to provide a method of attaching insulation to a surface, to reduce or overcome the disadvantages of the prior known methods.

This invention has particular application in regard to the insulation of furnace walls of high temperature furnaces. For the purposes of the present invention "high temperature" will mean temperatures in excess of about 1,600° F. and preferably in the range of about 1,600° F. to about 2,800° F. or more.

Furthermore, in the specification, reference to furnace walls shall mean all furnace surfaces which require insulation including ceilings, doors, and the like.

Ceramic fiber insulation materials are commercially available from several manufacturers and are well-known to those of ordinary skill in this art. Thus, for example, ceramic fiber blankets are manufactured under the trademarks or trade names "Kaowool" (Babcock and Wilcox), "Fiber-Frax" (Carborundum Co.), "Lo-Con" (Carborundum Co.), "Cero-Felt" (Johns-Manville Corp.) and "SAFFIL" (I.C.I.). While most of these ceramic fiber blankets have an indicated maximum operating temperature of about 2,300° F., the end or edge fiber exposure provided by reorientation of fiber strips can provide for effective operation up to about 2,800° F. when the appropriate grade of fiber is used. An appropriate grade would, for example, be SAFFIL alumina fibers.

In accordance with one aspect of the invention a method of forming an insulation member for insulating the walls of a furnace comprises:

(a) providing holes at spaced intervals in a cold face of a mat of fibrous insulation material, which cold face is to be directed towards a furnace wall during use;

(b) applying a liquid adhesive to the cold face; and (c) vibrating the adhesive to cause adhesive penetration into the holes of the mat.

The adhesive is preferably vibrated so that it fluidizes the adhesive to thereby cause the adhesive to penetrate into the holes and to improve the adhesive wetting of the cold face. In this way adhesive penetration can be achieved without the adhesive separating unduly into its separate components. Thus weakening of the adhesive properties of the adhesive can be reduced.

The holes may be formed in the cold face by any appropriate means. The means to be employed will depend upon the hole density required, upon the hole diameter required, upon the type of fibrous insulation material of the mat, and upon the desired cross-sectional configuration of the holes.

Where the hole density is low and the hole diameters are relatively small, the holes may generally be formed by simply forcing spikes or pins into the material to part the fibers of the material.

An alternative way of forming the holes would be to drill or bore the holes into the material of the mat.

In an alternative embodiment of the invention, the holes may be formed by vibrating a vibration plate having a plurality of vibration pins extending therefrom, so that the pins are vibrated, preferably at high frequency with low amplitude, to penetrate into the cold face of the mat.

While the size and depth of the holes may vary over a fair range, a presently preferred range for ceramic fiber insulation mat comprises hole diameters of between about 0.1 and 0.3 inches, and hole depths of between about $\frac{1}{8}$ and $\frac{3}{4}$ of an inch.

In a presently preferred embodiment of the invention, holes are formed in ceramic fiber insulation material having diameters of about 0.15 inches and depths of about $\frac{5}{8}$ of an inch.

The hole density may vary over a fair range. However, presently preferred hole densities vary between about 1 and about 6 holes per square inch.

In a presently preferred embodiment, the hole density is about four holes per square inch.

The adhesive may be applied to the cold face of the block by any conventional means. Thus, for example, the adhesive may be applied by a displaçeable roller which can be coated with adhesive and can then be displaced across the cold face to deposit adhesive thereon. Such a roller may be coated with adhesive by dipping into a tray of adhesive, by cooperating with a transfer roller which supplies adhesive, or by having adhesive sprayed onto it.

In an alternative example, adhesive may be applied to the cold face of the fibrous mat by spraying.

Insofar as the adhesives are concerned, any type of conventional adhesive may be employed which is capable of tolerating the temperatures to which the adhesive will be exposed during use, and which is capable of securing a mat of insulation material to a backing panel or substrate, or directly to a furnace casing of metal, brick, ceramic material or the like.

For high temperature furnace applications, the adhesive should preferably be a cement which is capable of tolerating temperatures in the vicinity of about 1,200° F.

The adhesives most frequently employed incorporate silicate cements. These cements may be in the form of potassium silicate, sodium silicate, colloidal silica, ethyl silicate or the like.

These cements are used with various types of fillers, which are generally inorganic fillers such as silica, sand, alumina, clays and the like.

A preferred cement is a potassium silicate cement combined with graded silica aggregate and kaolin clay as filler, and combined with an "HB" hardener. This "HB" hardener is a hardener which comprises a double heat condensed poly-aluminum phosphate manufactured by Hoechst of Germany and sold under the Hoechst trademark "HB".

Cements having various viscosities may be employed depending upon the type of fibrous insulation material employed, the hole sizes to be employed, and upon whether a backing panel is to be applied to the cold face or whether the cold face is to be applied directly to a vertical or downwardly directed furnace wall surface.

In the latter case a greater viscosity and thixatropy will be required to insure that a mat will remain in position when placed against such a furnace wall.

The viscosity of the adhesive may for example be in the range of about 350 to about 5000 centipoise.

The insulation material is preferably a fibrous insulation material. This invention may also, however, have application in regard to types of insulation materials other than fibrous insulation materials.

The insulation material may be any suitable insulation material which will provide a required degree of heat insulation for the intended application. Where the insulation material is in the form of a fibrous insulation material it may, for example, comprise a material such as a mineral fiber material, a refractory fiber material or a ceramic fiber material.

Where the insulation material is a ceramic fiber material, the material preferably comprises fibers arranged in edge on orientation with the fibers randomly oriented in fiber planes, and with the fiber planes being arranged to extend transversely or normally to the cold face of the mat.

The method may include the step of applying a backing panel to the cold face of the mat.

In this embodiment of the invention, the adhesive may conveniently be vibrated by applying a backing panel to the adhesive applied to the cold face, and by vibrating the backing panel to cause vibration of the adhesive.

The adhesive is preferably vibrated at high frequency and low amplitude to achieve effective temporary fluidization thereby allowing the fluidized adhesive to flow freely into the hole. Such temporary fluidization further enhances the wetting effect of the adhesive on the fiber surface of the cold face while combatting separation of the components of the adhesive.

The backing panel may be vibrated by locating the mat on a holder plate and by engaging the backing panel with a vibrator for vibrating the backing panel.

The backing panel may be in the form of a sheet material of any appropriate type. Thus, for example, it may be in the form of a sheet of metal or other appropriate material. Alternatively, for example, it may be in the form of a block such as a ceramic block. In yet a further alternative example of the invention, the backing panel may be in the form of a mesh panel, such as an expanded metal mesh or open frame panel.

The backing panel may conveniently be adapted for attachment to a furnace wall to thereby attach such an insulation member to a furnace wall. The backing panel may be adapted for attachment to a furnace wall by any suitable means. Thus, for example, it may be attached by welding, by a stud welding process, by bolting, by means of screws, or by engaging with premounted brackets, bolts or the like.

In an alternative embodiment of the invention, the method may include the step of attaching the insulation member to a furnace wall by attaching the adhesive of the cold face to such a furnace wall.

In this embodiment of the invention, the adhesive may be vibrated on the cold face by any appropriate means. The treated mat may then be secured directly against a furnace wall by means of a second adhesive layer applied either to the first layer or to the furnace wall.

In this embodiment of the invention, the adhesive may be vibrated by engaging the periphery of the cold face with vibration means to vibrate the adhesive. Alternatively, for example, a mesh or frame panel, or a panel having projections thereon may be placed into engagement with adhesive applied to the cold face, and such panel may then be vibrated to fluidize the adhesive, whereafter the panel may be removed for reuse.

The invention further extends to a method of reducing the effects of moisture induced corrosion of an adhesive at a cold face of a mat of insulation material, which comprises causing the adhesive to penetrate into blind holes formed in the cold face of such a mat to thereby space a proportion of the bond interface between the material of the mat and the adhesive away from the cold face.

The invention further extends to an insulation member formed by the method as described herein.

The invention extends to an insulation member for use in insulating a furnace surface, the member comprising:

(a) a mat of insulation material having a cold face to be directed towards a furnace surface to be insulated, the mat having a plurality of bores provided in its cold face; and (b) an adhesive applied to the cold face, the adhesive having fingers of adhesive extending into the bores.

The mat of insulation material is preferably a mat of fibrous insulation material as hereinbefore described.

The insulation member is preferably in the form of an insulation module for use in side-by-side relationship with corresponding modules for insulating a furnace wall.

In a preferred embodiment of the invention, the insulation member has a backing panel fixed to the cold face. The backing panel is preferably a mesh, expanded mesh or open frame panel which is at least partially embedded in the adhesive of the cold face.

The invention further extends to a method of attaching an insulation member to a furnace wall of a high temperature furnace, which comprises providing a plurality of holes in a cold face of a mat of insulation material, vibrating an adhesive on the cold face to cause the adhesive to penetrate into the holes, and applying the adhesive to a furnace wall to thereby attach the insulation member to the wall.

Embodiments of the invention are now described by way of example with reference to the accompanying drawings.

In the drawings:

FIG. 6 shows a plan view of one preferred embodiment of an insulation module in accordance with this invention;

FIGS. 7 and 8 show end elevations of the module of FIG. 6, in the process of formation thereof;

Figure 3:
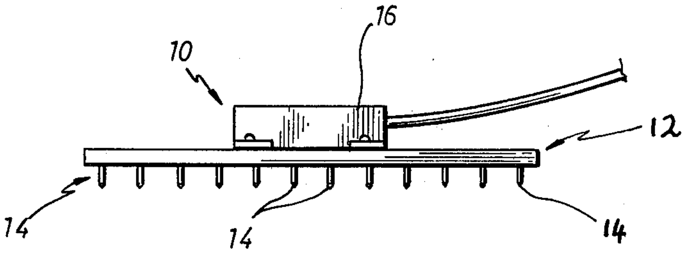
FIGS. 2 and 3 show an end view and a side view respectfully of the bore forming device of FIG. 1.
Figure 1:
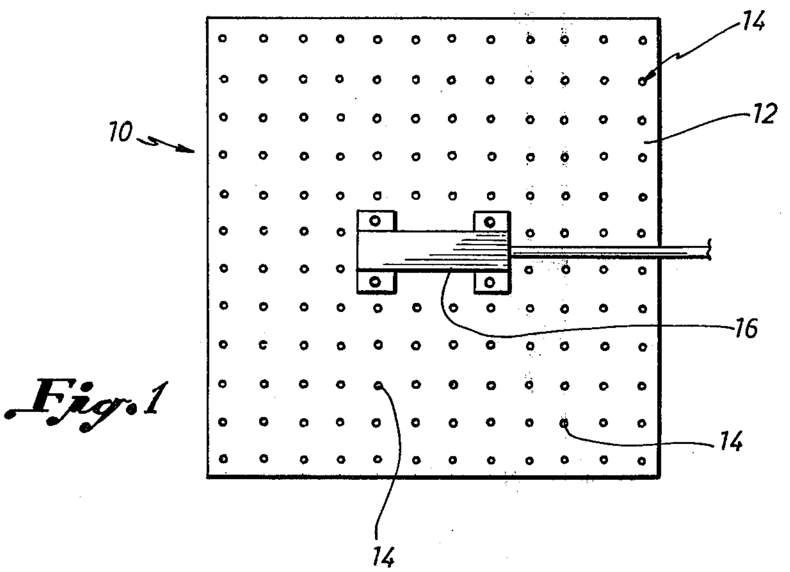
FIG. 1 shows a plan view of a bore forming device for forming a plurality of bores in a cold face of an insulation mat.
Figure 2:
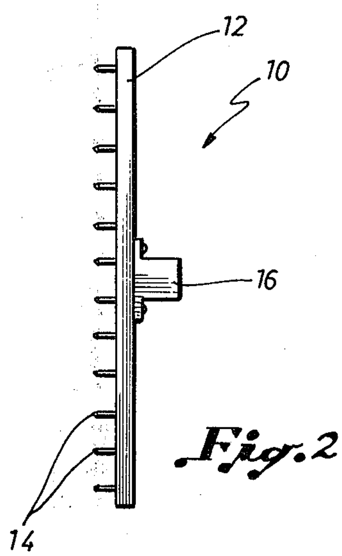

With reference to FIGS. 1 to 3 of the drawings, reference numeral 10 refers generally to a bore forming device for use in forming a plurality of blind holes or bores in a cold face of a mat of fibrous insulation material, which cold face is to be directed towards a furnace casing which is to be insulated.

The bore forming device comprises a vibration plate 12 of an appropriate dimension for the dimensions of the insulation module to be formed.

The vibration plate 12 has a plurality of vibration pins 14 extending therefrom.

In the illustrated embodiment, the pins 14 are fixed to the vibration plate 12 by forcing them through the vibration plate 12 from its upper side until they project from the lower side of the plate.

For forming insulation modules of ceramic fiber insulation material having a nominal size of 12 inches by 12 inches, the vibration pins 14 have a length of $\frac{5}{8}$ of an inch, and a diameter of 0.15 inches. The pins 14 are further spaced to provide a pin density of 4 pins per square inch.

The bore forming device 10 further includes a vibrator device 16. The vibrator device 16 is mounted on the vibration plate 12.

The vibrator device 16 may be a device of any conventional type such as an air powered or electrically power vibrator which can create low amplitude high frequency vibrations in a direction parallel to the elongated axis of the vibrator device 16, or in an orbital configuration.

Figure 4:
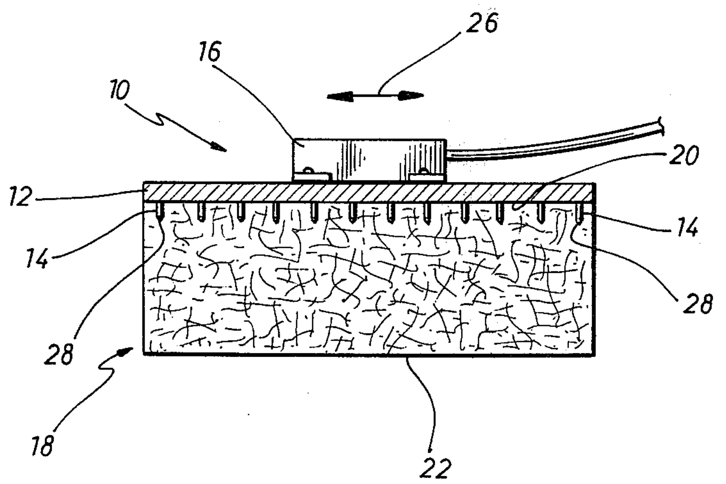
FIG. 4 shows a side elevation of a mat of insulation material with the bore forming device of FIGS. 1 through 3 in use thereon to form a plurality of spaced bores.
Figure 5:
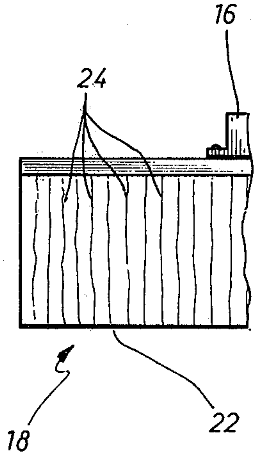
FIG. 5 shows a fragmentary and elevation of the embodiment of FIG. 4.

With reference to FIGS. 4 and 5 of the drawings, reference numeral 18 refers generally to a mat of ceramic fiber insulation material for forming an insulation module in accordance with this invention.

The mat 18 has a cold face 20 to be directed towards a furnace wall surface during use, and has an opposed hot face 22.

The mat 18 comprises a ceramic fiber material with the ceramic fibers randomly oriented in fiber planes 24 (as shown in FIG. 5) with the fiber planes 24 being arranged to extend normally to the cold face 20 and parallel to the opposed sides of the mat 18. The fiber planes 24 therefore run parallel to the plane of the paper in the mat 18 as illustrated in FIG. 4, and run transversely to the plane of the paper in the end elevation illustrated in FIG. 5.

For forming a plurality of blind bores in the cold face 20 of the mat 18, the mat 18 can be placed on a suitable support surface, such as a holder plate, for example (as shown in FIGS. 7 and 8). The bore forming device 10 can then be located above the cold face 20 of the mat 18 and the vibrator device 16 can be actuated to vibrate the bore forming device 10 in a direction parallel to the opposed sides of the mat 20—thus in the direction indicated by the arrows 26.

Such vibration of the device 10 causes the vibration pins 14 to penetrate into the ceramic fiber insulation material of the mat 18 to thereby form blind bores 28 at appropriately spaced intervals in the cold face 20 of the mat 18.

With reference to FIGS. 6, 7 and 8 of the drawings, the mat 18 of FIGS. 4 and 5 is shown being subjected to further treatment in accordance with this invention, and is shown in its completed form in FIG. 6.

In FIGS. 7 and 8 of the drawings, the mat 18 is shown located in position on a support surface such as a holder plate 29. The holder plate 29 has upwardly projecting side walls 30 which serve to locate the mat 18 in position on the holder plate.

The side walls 30 extend upwardly to a zone proximate the cold face of the mat 18 to thereby reduce vibration of the mat 18 during application of the adhesive.

After the mat 18 has been placed on the holder plate 29, an adhesive 32 is applied in a coating layer over the cold face 20.

The adhesive layer 32 may be applied by any conventional means.

After application of the adhesive layer 32, a backing panel 34 of expanded metal mesh is placed onto the adhesive layer 32.

The backing panel 34 typically has dimensions of 9 inches by 12 inches for a 12 inch by 12 inch mat 18.

The backing panel 34 has attachment means 36 provided thereon for use in attaching the backing panel 34 and thus the mat 18 when secured thereto, to a furnace wall surface for insulating such a furnace wall surface.

The attachment means 36 comprises an annular washer defining a hole 38 through which a bolt or screw can be passed, or through which a tip of a welding stud can be passed for securing the backing panel 34 to a furnace wall. The annular washer of the attachment means 36 serves to distribute the pressure of such a bolt, screw or stud and thus provide for effective engagement of the backing panel 34 with a furnace wall.

The backing panel 34 is temporarily engaged with a vibrator device 40 as shown in FIGS. 7 and 8. The vibrator device 40 may correspond with the vibrator device 16, and may have any appropriate clamping or gripping means for clamping the vibrator device 40 to the backing panel 34.

When the vibrator device 40 is actuated, it provides a high frequency low amplitude vibration which causes sufficiently rapid vibration of the adhesive layer 32 to temporarily fluidize the adhesive 32.

Such fluidization of the adhesive 32 causes it to rapidly enter into the bores 28. It further causes enhancement of the wetability of the fiber surface at the cold face with which the adhesive 32 is in contact. Because of the temporary fluidization of the adhesive 32, it wets the fibers at the cold face without causing undue separation of the components of the adhesive. This does, therefore, combat undue deterioration of the adhesive.

During operation of the vibrator device 40, the backing panel 34 will sink into the adhesive layer 32 while it is in its fluidized state until, after vibration is complete as shown in FIG. 8, the backing panel 34 is partly embedded in the adhesive 32.

The vibrator device 40 may then be removed and the adhesive may be allowed to cure.

After the adhesive has cured, an insulation module for insulating a high temperature furnace has been formed. The module comprises a module 44 as shown in FIG. 6. In FIG. 6 the blind bores 28 have been shown for the sake of clarity. It will be appreciated, however, that these holes will generally be obscured by the adhesive layer 32 which remains spread over the cold face 20.

The module 44 is then in a form where it is ready for use and may be attached to a furnace wall or casing by engaging the attachment means 36 with a pre-positioned bracket, bolt or stud, or by passing a screw through the attachment means 36, or by welding the attachment means 36 to the casing by means of a stud welding technique.

In an average furnace environment, the cold face 20 of the module 44 would be at a temperature of about 250° F. When the furnace walls cool below 200° F. during use moisture can and usually does form thereby ensuring that the cold face 20, the backing panel 34 and the furnace casing are all damp or moist.

Because of the presence of moisture at the cold face 20, a corrosive environment will be produced at the cold face as a result of the formation of corrosive liquids such as sulfuric or sulfurous acid. Such acids will attack the exposed surfaces of the adhesive 32. In addition, in the presence of the metal provided by the backing panel 34 and the furnace casing corrosive ferric compounds form which are corrosive towards the ceramic fiber and would thus tend to corrode the ceramic fibers in this corrosive interface.

However, as you advance towards the hot face 22 from the cold face 20 in such an average furnace environment, the temperature increases rapidly. Thus, for example, about $\frac{1}{4}$ of an inch away from the cold face 20, the temperature would be in the vicinity of about 400° F. In other words, at this distance from the cold face 20, the temperature is sufficiently high to insure that moisture cannot exist. For this reason there will be no corrosive environment of the type described, at a point spaced about $\frac{1}{4}$ of an inch from the cold face 20.

The adhesive 32, as a result of the mode in which it has been applied, has wet the fiber interface and has penetrated partially into the fibers of the mat 18. In addition, fingers of adhesive have penetrated into the bores 28 of the mat 18. This adhesive is removed from the corrosive plane at the cold face 20. For this reason the interface between this adhesive and the fibers of the mat 18 will not be subjected, or will not be subjected to the same extent, to the corrosive action of the corrosive materials which can form at the cold face 20. Therefore, both the adhesive and the fibers in the interface spaced from the cold face 20, will be completely protected, or at least partially protected from the corrosive action of any corrosive materials formed at the cold face.

The module 44 should therefore be much more resistant to corrosion and should therefore have a much greater effective of life than a module of conventional type which merely has a coating of adhesive applied to its cold face before it is bonded to a backing panel such as the panel 34 or is bonded to a furnace wall surface.

Because the backing panel 34 becomes partially embedded in the adhesive 32, the interface between the backing panel 34 and the adhesive 32 will also be protected from the corrosive action of materials formed at the cold face thereby providing a better and longer lasting bond between the adhesive and the backing panel 34.

Because of temporary fluidization of the adhesive 32 in accordance with the method of this invention, and because of the bores 28, the potential bonded surface area at the cold face 20 of the mat 18 is increased substantially. The bonding surface area may generally be increased by from about 20 to 30 percent up to 50 to 80 percent or more. This increase in the potential bonded surface area is of no value unless the adhesive or cement 32 can penetrate completely into the bores 28. By temporary fluidization of the cement 32, effective penetration is achieved to not only to provide a bonded interface which is substantially greater, but also to provide a substantial bonded interface which is removed from the highly corrosive environment at the cold face of the module 44.

Figure 9:
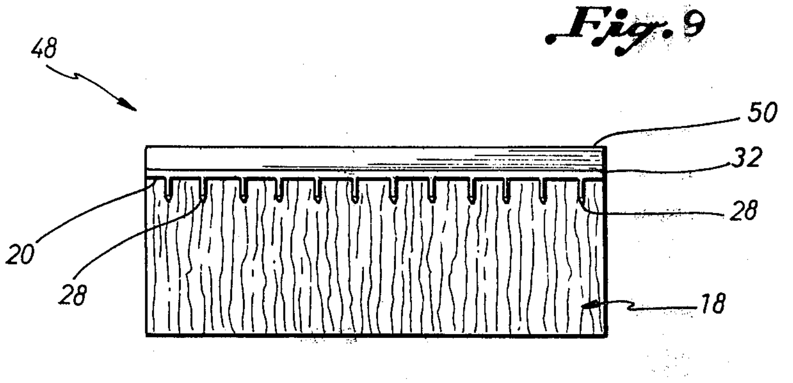
FIG. 9 shows an end elevation of an alternative embodiment of an insulation module in accordance with this invention.

With reference to FIG. 9, reference numeral 48 refers generally to an alternative embodiment of a module in accordance with this invention.

The module 48 has a mat 18 of ceramic fibrous insulation material corresponding with the mat 18 illustrated in the previous figures of the drawings. The mat 18 has a cold face 20 wherein a plurality of spaced bores 28 have been provided in the same way as hereinbefore described.

The module 48 has a backing panel 50 in the form of a block of ceramic insulation material.

The backing panel 50 has the mat 18 secured thereto by means of an adhesive 32. The backing panel 50 may be secured to a furnace wall to thereby secure the module 48 to the furnace wall.

In forming the module 48 the backing panel 50 may be vibrated to fluidize the cement 32. Alternatively, an open frame, mesh or foraminous panel, or a panel having projections projecting therefrom, may be applied to the adhesive layer and may be vibrated to achieve effective fluidization of the cement. Thereafter it may be removed and the backing panel 50 may be applied to the cement layer to cause it to adhere to the mat 18.

Figure 10:
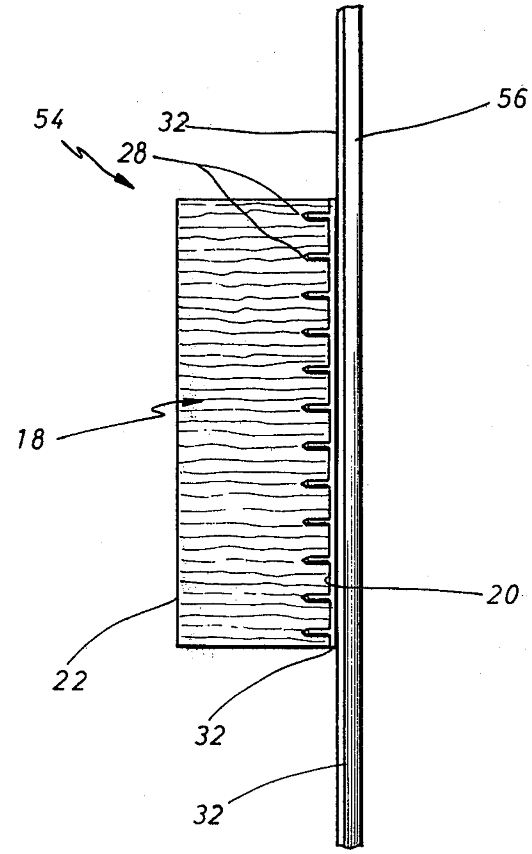
FIG. 10 shows a fragmentary side elevation of an alternative embodiment of an insulation module attached to a furnace wall or casing.

With reference to FIG. 10 of the drawings, reference numeral 54 refers to yet a further alternative embodiment of a module in accordance with this invention.

The module 54 comprises a mat 18 which has bores 28 formed in its cold face 20 in exactly the same way as hereinbefore described.

An appropriate adhesive 32 is applied to the cold face 20 and is vibrated by any appropriate means to cause wetting of the cold face 20 and effective penetration of the adhesive into the bores 28 as hereinbefore described.

Fluidization of the adhesive 32 may be achieved by vibrating the mat 18, or by vibrating the adhesive as described, for example, with reference to FIG. 9.

Once the adhesive has been temporarily fluidized sufficiently to penetrate the bores 28, vibration may be discontinued. The formed module 54 may then be applied directly to a furnace wall 56 as shown by means of a further layer of adhesive applied to either the furnace wall or to the cured adhesive on the cold face to thereby attach the module 54 to the furnace wall 56.

The module 54 can provide substantially the same advantages as described with reference to the module 44, in that the fingers of adhesive 32 enter the bores 28 and are therefore spaced from the zone where the corrosive fluids can exist. In addition, there is a greater surface area at the interface between the fibers of the mat 18 and the cement 32.

It will be appreciated that this invention can be applied not only to modules as described with reference to the drawings, but also to sheets or panels of various shapes and sizes and of various insulation materials for use in insulating surfaces.

It will further be appreciated that the bores 28 may be formed in various other methods other than the method disclosed in the description with reference to the drawings. It will further be appreciated that vibration of the cement or adhesive to achieve temporary fluidization and penetration into the holes or bores may be achieved by various other methods.

What is claimed is:

1. A method of forming an insulation member for insulating the walls of a furnace, the method comprising:

(a) providing holes at spaced intervals in a cold face of a mat of fibrous insulation material, which cold face is to be directed towards a furnace wall during use;

(b) applying a liquid adhesive to the cold face; and (c) vibrating the adhesive to cause adhesive penetration into the holes of the mat.

2. A method according to claim 1, in which the adhesive is vibrated to fluidize the adhesive to thereby cause the adhesive to penetrate into the holes and to improve adhesive wetting of the cold face.

3. A method according to claim 1, in which the holes are provided in the cold face by forming blind holes in the cold face.

4. A method according to claim 3, in which blind holes are formed in the cold face by vibrating pin members into the cold face.

5. A method according to claim 4, in which the blind holes are formed by vibrating a vibration plate having a plurality of vibration pins extending therefrom, so that the pins penetrate into the mat.

6. A method according to any one of claims 3 to 5, in which the holes are formed having diameters of between about 0.1 and about 0.3 inches.

7. A method according to claim 6, in which the holes are formed with diameters of about 0.15 inches.

8. A method according to any one of claims 3 to 5, in which the holes are formed with a depth of between about $\frac{1}{8}$ and about $\frac{3}{4}$ of an inch.

9. A method according to claim 1, in which the holes are formed with a diameter of about $\frac{5}{8}$ of an inch.

10. A method according to any one of claims 3 to 5, in which the holes are formed to provide a hole density of between about one per square inch and about six per square inch.

11. A method according to claim 10, in which the holes are formed to provide a hole density of about four per square inch.

12. A method according to claim 1, in which the adhesive is applied by means of a displaceable roller system.

13. A method according to claim 1, in which the adhesive comprises a silicate cement.

14. A method according to claim 13, in which the adhesive comprises a silicate cement capable of operating at temperatures between about 600° F. and about 1800° F.

15. A method according to claim 1, in which the adhesive comprises a cement capable of operating at temperatures between about 600° F. and about 1800° F.

16. A method according to claim 13, claim 14 or claim 15, in which the cement has a viscosity of between about 350 and about 5000 centipoise.

17. A method according to claim 1, in which the fibrous insulation material comprises a ceramic fiber material.

18. A method according to claim 17, in which the ceramic fiber material comprises fibers randomly oriented in fiber planes with the fiber planes being arranged to extend transversely to the cold face of the mat.

19. A method according to claim 1, which includes the step of applying a backing panel to the cold face of the mat.

20. A method according to claim 19, in which the adhesive is vibrated by applying the backing panel to the adhesive, and by vibrating the backing panel.

21. A method according to claim 20, in which the backing panel is vibrated by locating the mat on a holder plate, and by vibrating the backing panel.

22. A method according to any one of claims 19 to 21, in which the backing panel comprises an expanded metal mesh sheet.

23. A method according to any one of claims 19 to 21, in which the backing panel comprises a mesh panel, a sheet panel or an insulating block.

24. A method according to any one of claims 19 to 21, in which the backing panel is adapted for attachment to a furnace wall.

25. A method according to claim 1, which includes the step of attaching the insulation member to a furnace wall by attaching the adhesive to such a wall.

26. A method according to claim 25, in which the adhesive is attached to a furnace wall by providing a separate coating of adhesive to the furnace wall and then attaching the adhesive of the insulation member to the adhesive coating.

27. A method of reducing the effects of moisture induced corrosion of an adheisve at a cold face of a mat of insulation material, which comprises causing the adhesive to penetrate into holes provided in the cold face of such a mat to thereby space a proportion of the bond interface between the material of the mat and the adhesive away from the cold face.

28. A method according to claim 27, in which holes are formed in the cold face to space at least about 20% of the interface between the adhesive and the cold face surface inwardly of the cold face.

29. A method according to claim 28, in which at least about 30% of the interface is spaced inwardly of the cold face.

30. A method according to claim 27 or claim 28, in which the holes are formed with a sufficient depth to ensure that at least about 20 to 30% of the interface will be positioned in a zone where moisture will not form in a furnace during use.

31. A method of forming an insulation module for insulating the walls of a high temperature furnace, the method comprising:

(a) selecting a mat of fibrous insulation material having a cold face to be directed towards a furnace wall during use;

(b) forming holes at spaced intervals in the cold face of the mat;

(c) applying an adhesive to the cold face of the mat; and (d) vibrating the adhesive to fluidize the adhesive and cause adhesive penetration into the holes of the mat.

32. A method of improvidng the bonding effect of an adhesive in the bonding of a cold face of a module of fibrous insulation material to a substrate, which comprises providing bores at spaced intervals in the cold face, applying adhesive to the cold face, and vibrating the adhesive to penetrate into the bores.

33. A method of forming an insulation module for insulating a furnace wall, the method comprising:

(a) placing a mat of fiber insulation material on a holder plate;

(b) placing a vibrator plate having a plurality of vibrator pins onto a cold face of the mat which is to be directed towards a furnace wall during use;

(c) vibrating the vibrator plate to form bores in the cold face;

(d) removing the vibrator plate;

(e) applying an adhesive to the cold face; and (f) vibrating the adhesive to cause penetration thereof into the bores.

34. A method according to claim 33, which includes the step of applying an expanded mesh backing panel to the adhesive and vibrating the adhesive by vibrating the backing panel to cause the adhesive to penetrate into the bores as a result of fluidization of the adhesive, and to cause the backing panel to engage with the adhesive.

35. A method of attaching an insulation member to a furnace wall of a high temperature furnace, which comprises providing a plurality of holes in a cold face of a mat of insulation material, vibrating an adhesive on the cold face to cause the adhesive to penetrate into the holes, and applying the adhesive to a furnace wall to thereby attach the insulation member to the wall.

36. An insulation member for use in insulating a furnace surface, the member comprising:

(a) a mat of fibrous insulation material having a cold face to be directed towards a furnace surface to be insulated, the mat having a plurality of bores provided in its cold face; and (b) an adhesive applied to the cold face, the adhesive having fingers of adhesive extending into the bores.

37. An insulation member according to claim 36, which is in the form of an insulation module for use in side-by-side relationship with corresponding modules for insulating a furnace wall.

38. A member according to claim 36 in which the adhesive is an adhesive vibrated in position on the cold face for effecting penetration of the adhesive into the bores.

39. A member according to claim 36, in which the bores are bores provided by vibrating pin members into the cold face.

40. A member according to claim 36, in which the bores have diameters of between about 0.15 and about 0.3 inches, and in which the bores have depths of between about $\frac{1}{8}$th and about $\frac{3}{4}$ of an inch.

41. A member according to claim 40, in which each bore has a diameter of about 0.15 inches and has a depth of about $\frac{5}{8}$ of an inch.

42. A member according to claim 36, in which the bores are positioned to provide a bore density of between about one and about six bores per square inch.

43. A member according to claim 36, in which the adhesive comprises a silicate cement capable of operating at temperatures of between about 600° F. and about 1800° F.

44. A member according to claim 36, in which the fibrous insulation material comprises a mineral, refractory or ceramic fiber material.

45. A member according to claim 44, in which the fibrous material comprises a ceramic fiber material having fibers randomly oriented in fiber planes, and having the fiber planes arranged to extend transversely to its cold face.

46. A member according to claim 36 or claim 41, having a backing panel fixed to the cold face.

47. A member according to claim 46, in which the backing panel comprises a mesh at least partially embedded in the adhesive.

48. A member according to claim 46, in which the backing panel is a panel which has been fixed to the cold face by vibration of the panel having caused fluidization of the adhesive, penetration of the adhesive into the bores, and penetration of the panel into the adhesive.

49. An insulation module for insulating a wall surface of a high temperature furnace, the module comprising:

(a) a mat of ceramic fiber insulation material formed out of fiber planes with the fiber planes extending normally to a cold face of the mat which is to be directed towards a furnace wall to be insulated;

(b) the mat having a plurality of holes formed at spaced intervals in its cold face;

(c) an adhesive provided on the cold face, the adhesive having adhesive fingers extending into the holes and into the fibers;

(d) a backing panel fixed to the cold face by means of the adhesive, for attaching the module to a furnace wall.

50. A module according to claim 49, in which the backing panel comprises an apertured panel.

51. A module according to claim 50, in which the backing panel comprises an expanded metal mesh.

52. An insulation member for use in insulating a furnace surface, the member comprising:

(a) a block of insulation material having a cold face to be directed towards a furnace surface to be insulated, the mat having a plurality of bores provided in its cold face; and (b) an adhesive applied to the cold face, the adhesive having fingers of adhesive extending into the bores.

* * * * *

UNITED STATES PATENT OFFICE
CERTIFICATE OF CORRECTION

Patent No. 4,443,509 Dated April 17, 1984

Inventor(s) Robert A. Sauder

It is certified that error appears in the above-identified patent and that said Letters Patent are hereby corrected as shown below:

Column 14, line 60, delete "0.15" and insert --0.1--

Signed and Sealed this

*Twenty-sixth* Day of *February 1985*

[SEAL]

*Attest:*

DONALD J. QUIGG

*Attesting Officer* *Acting Commissioner of Patents and Trademarks*